(12) United States Patent
Habbel

(10) Patent No.: US 12,510,387 B1
(45) Date of Patent: Dec. 30, 2025

(54) FLUID FLOW SENSING ASSEMBLY AND RELATED METHODS

(71) Applicant: Arizona Air-Scent, Inc., Scottsdale, AZ (US)

(72) Inventor: Sam Habbel, Scottsdale, AZ (US)

(73) Assignee: Arizona Air-Scent, Inc., Scottsdale, AZ (US)

( * ) Notice: Subject to any disclaimer, the term of this patent is extended or adjusted under 35 U.S.C. 154(b) by 413 days.

(21) Appl. No.: 18/165,895

(22) Filed: Feb. 7, 2023

Related U.S. Application Data

(60) Provisional application No. 63/267,709, filed on Feb. 8, 2022.

(51) Int. Cl.

| | |
|---|---|
| *A61L 9/12* | (2006.01) |
| *B65D 83/26* | (2006.01) |
| *F24F 1/008* | (2019.01) |
| *F24F 1/0355* | (2019.01) |
| *F24F 8/50* | (2021.01) |
| *G01F 1/06* | (2006.01) |

(52) U.S. Cl.
CPC ............... *G01F 1/06* (2013.01); *A61L 9/122* (2013.01); *B65D 83/265* (2013.01); *F24F 1/008* (2019.02); *F24F 1/0355* (2019.02); *F24F 8/50* (2021.01); *A61L 2209/111* (2013.01); *A61L 2209/134* (2013.01)

(58) Field of Classification Search
CPC ...... G01F 1/06; A61L 9/122; A61L 2209/111; A61L 2209/134; B65D 83/265; F24F 1/008; F24F 1/0355; F24F 8/50
See application file for complete search history.

(56) References Cited

U.S. PATENT DOCUMENTS

| 8,790,590 B1 * | 7/2014 | Wright, IV | .......... | B65D 83/267 |
| | | | | 422/305 |
| 9,352,065 B2 * | 5/2016 | Habbel | ................ | B65D 83/265 |

FOREIGN PATENT DOCUMENTS

| DE | 202008017937 U1 * | 12/2010 | ............... G01F 1/06 |
| EP | 0682232 A2 * | 11/1995 | ............... G01F 1/06 |
| JP | 2013512059 A * | 4/2013 | .......... A47J 31/5255 |
| KR | 102155591 B1 * | 9/2020 | ............... A61L 9/22 |
| WO | WO-2012074340 A2 * | 6/2012 | ............. G01F 1/065 |

OTHER PUBLICATIONS

DE-202008017937-U1, English Translation (Year: 2010).*
EP-0682232-A2, English Translation (Year: 1995).*
JP-2013512059-A, English Translation (Year: 2013).*
KR-102155591-B1, English Translation (Year: 2020).*
WO-2012074340-A2, English Translation (Year: 2012).*

* cited by examiner

*Primary Examiner* — Ryan D Walsh
(74) *Attorney, Agent, or Firm* — IPTechLaw

(57) ABSTRACT

Implementations of a fluid flow sensing assembly may include a first shell coupled with a second shell including a central vane structure; a blade assembly rotatably coupled within the central vane structure, the blade assembly including one or more flags extending from a central hub; and a one or more fluid flow sensor elements coupled with the second shell of the flow sensor, the one or more fluid flow sensor elements configured to detect motion of the one or more flags where the assembly may be configured to be coupled with one or more scent diffusers.

20 Claims, 8 Drawing Sheets

FLUID FLOW SENSING ASSEMBLY AND RELATED METHODS

CROSS REFERENCE TO RELATED APPLICATIONS

This document claims the benefit of the filing date of U.S. Provisional Patent Application 63/267,709 entitled "Flow Sensors and Related Methods" to Sam Habbel which was filed on Feb. 8, 2022, the disclosure of which is hereby incorporated entirely herein by reference.

BACKGROUND

1. Technical Field

Aspects of this document relate generally to fluid flow sensing assembly and a related method. More specific implementations involve sensing systems for use in measuring flow of air for releasing a scent agent.

2. Background

Fluid flow sensors detect a flow of a fluid. Many different types of fluid flow sensors have been devised to allow for flow detection at various temperatures and pressures.

SUMMARY

Implementations of a fluid flow sensing assembly may include a first shell coupled with a second shell including a central vane structure; a blade assembly rotatably coupled within the central vane structure, the blade assembly including one or more flags extending from a central hub; and a one or more fluid flow sensor elements coupled with the second shell of the flow sensor, the one or more fluid flow sensor elements configured to detect motion of the one or more flags where the assembly may be configured to be coupled with one or more scent diffusers.

Implementations of fluid flow sensing assemblies may include one, all, or any of the following:

The first bushing may be coupled on a first and a second bushing may be coupled on a second side of the blade assembly to enable rotatable coupling of the blade assembly with the first shell and the second shell.

The blade assembly may include a blade portion coupled with a blade axle.

The blade portion may be fixedly coupled with the blade axle.

The blade portion may be rotatably coupled with the blade axle.

The assembly may be electrically coupled through electrical connectors with the one or more fluid flow sensor elements.

The assembly may include a wireless module configured to wirelessly communicate with one or more scent diffusers over a wireless telecommunication channel.

The assembly may include wherein one or more fluid flow sensor elements may be one of Hall effect sensors, photosensors, optical encoder sensors, capacitive sensors, or any combination thereof.

Implementations of a fluid flow sensing assembly may include a central vane structure coupled with a blade assembly including a blade axle; a hub coupled to the blade axle; one or more flags coupled with the hub; a one or more fluid flow sensor elements positioned in the central vane structure configured to detect movement of the one or more flags; and a one or more electrical connectors coupled with the central vane structure configured to be coupled with one or more scent diffusers.

Implementations of a fluid flow sensing assembly may include one, all, or any of the following:

The first bushing may be inserted on a first side of the blade assembly and a second bushing may be inserted on a second side of the blade assembly to enable rotatable coupling of the blade assembly with the first shell and the second shell.

The electrical connectors may be electrically coupled with the one or more fluid flow sensor elements.

The assembly may include a wireless module configured to wirelessly communicate with one or more scent diffusers over a wireless telecommunication channel.

The one or more fluid flow sensor elements may be one of Hall effect sensors, photosensors, optical encoder sensors, capacitive sensors, or any combination thereof.

Implementations of a method of sensing fluid flow may include providing a fluid flow sensor including a central vane structure coupled with a blade assembly including a hub and one or more flags coupled with the hub, the central vane structure including one or more fluid flow sensor elements electrically coupled with at least one electrical connector included in the central vane structure contacting the blade assembly with airflow causing the blade assembly to rotate and generating a corresponding electrical signal using the one or more flags of the hub and the one or more flow sensor elements and supplying the electrical signal to the at least one electrical connector. The method may also include conveying the electrical signal from the at least one electrical connector to a scent diffuser; processing the generated signal with the scent diffuser using a processor to determine a state of the airflow; and in response to determining a state of the airflow, releasing a scent composition with the scent diffuser based on one or more predetermined thresholds associated with the state of the airflow.

Implementations of a method of sensing fluid flow may include one, all, or any of the following:

Upon detecting no flow of air by the flow sensor the method may include altering the signal reaching the scent diffuser when there may be no flow of air; processing the generated signal by the scent diffuser using a processor; and stopping the release of the scent composition by the scent diffuser based on one or more predetermined threshold.

The electrical connectors may be electrically coupled with the one or more fluid flow sensor elements.

The fluid flow sensor further may include aa wireless module configured to wirelessly communicate with one or more scent diffusers using a wireless telecommunication channel.

The one or more fluid flow sensor elements may be one of a Hall effect sensor, a photosensor, an optical encoder sensor, a capacitive sensor, or any combination thereof.

The electrical signal may be conveyed to the scent diffuser for signal processing by the scent diffuser.

The method may include conveying the presence of the signal by the flow sensors to the scent diffuser to enable to scent diffuser to selecting a pre-programmed action in response.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended fluid flow sensing assembly and related methods will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such fluid flow sensing assembly and related methods, and implementing components and methods, consistent with the intended operation and methods.

Figure 1:
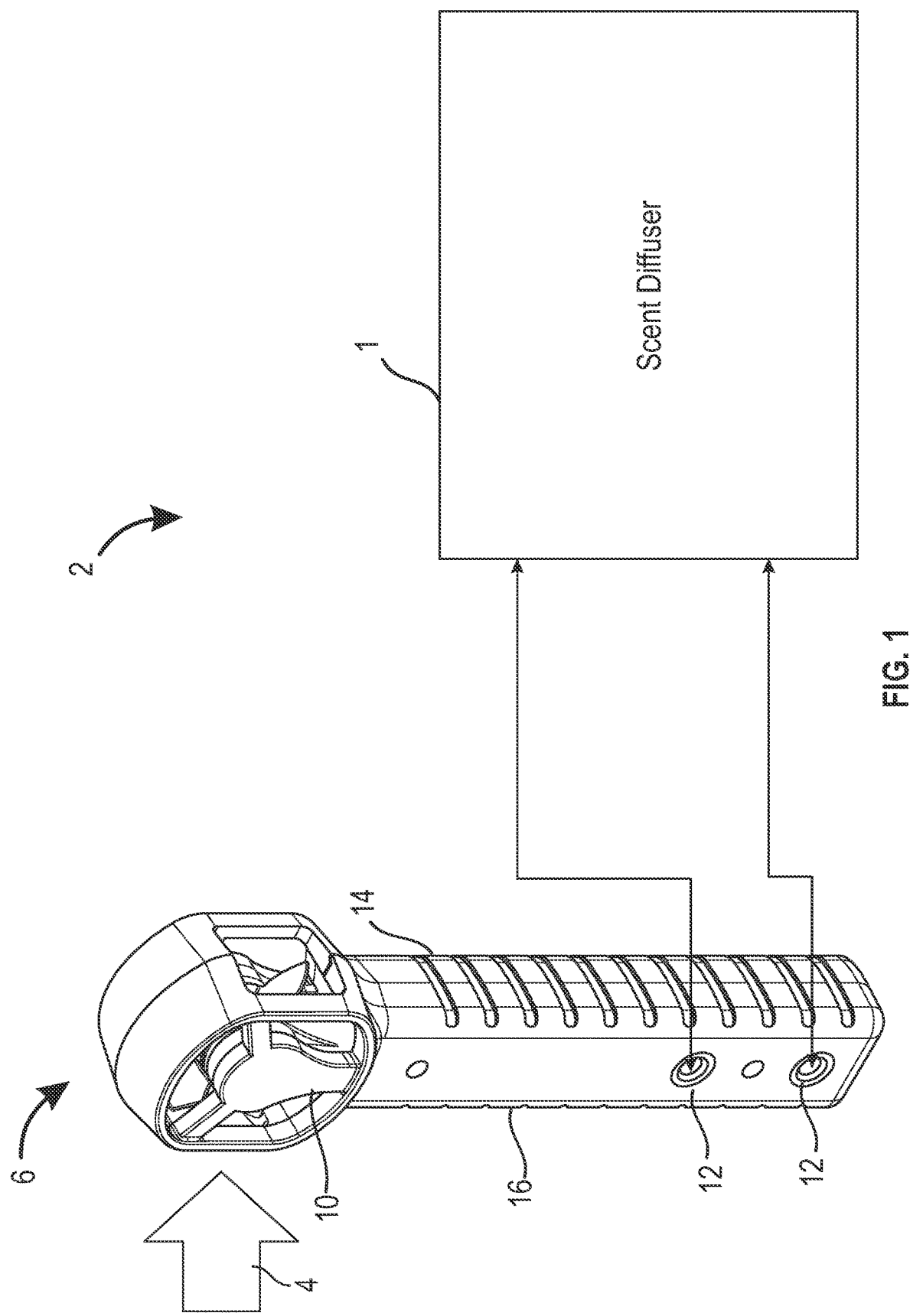
FIG. 1 is an implementation of a fluid flow sensing assembly coupled to a scent diffuser.

Referring to FIG. 1, an implementation of a fluid flow sensor assembly 2 is illustrated. As illustrated in FIG. 1, the fluid flow sensor assembly 2 includes a scent diffuser 1 in a location either adjacent to (in the case of being placed in an HVAC duct) or in a room (if being mounted on a wall or placed behind a piece of furniture or structure). FIG. 1 illustrates the scent diffuser 1 electrically coupled (or communicatively coupled) with the fluid flow sensor 6 which is in contact with airflow indicated by arrow 4. As airflow 4 contacts the fluid flow sensor 6, an electrical signal is generated in response, and conveyed to the scent diffuser 1. The scent diffuser 1 then processes the electrical signal using a processor or other logic circuit contained in the scent diffuser 1 to determine whether a release of scent composition should take place (or stop), depending on the situation. For example, when the fluid flow sensor 6 detects airflow 4 after a period of no air flow 4, the electrical signal may be used by the scent diffuser 1 to determine when to release one or more dispenses of a scent composition. When the fluid flow sensor 6 then detects no airflow, the resulting electrical signal (or lack thereof in some implementations) is used by the scent diffusers 1 to determine when to stop releasing scent compositions. In some implementations, the electrical signal from the fluid flow sensor 6 may be used by the scent diffuser 1 to determine when to enter or wake from a sleep state in addition to determining the timing of dispenses of scent composition. A wide variety of methods of operation using the electrical signal(s) from the fluid flow sensor 6 are possible using the principles disclosed herein.

Figure 2:
FIG. 2 is a top view of a fluid flow sensor implementation.
Figure 3:
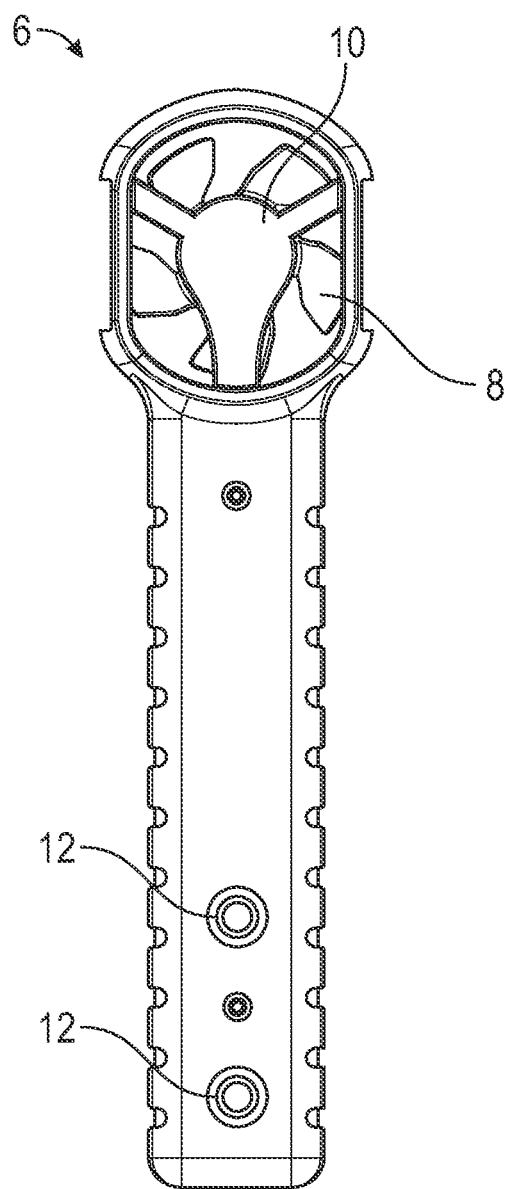
FIG. 3 is a front view of the fluid flow sensor implementation of FIG. 2.
Figure 4:
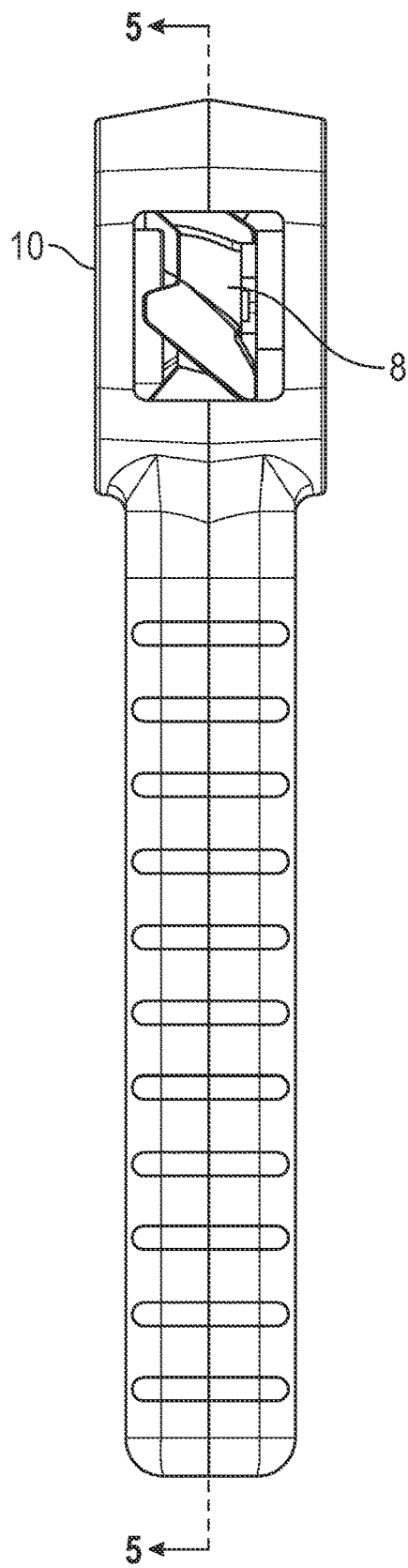
FIG. 4 is a side view of the fluid flow sensor implementation of FIG. 2.
Figure 5:
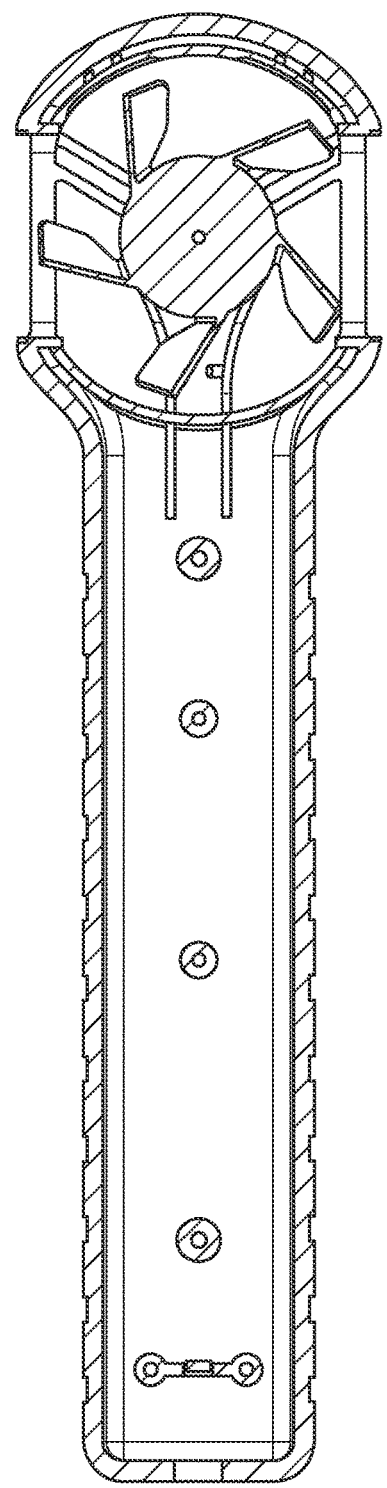
FIG. 5 is a rear view of the fluid flow sensor implementation of FIG. 2.
Figure 6:
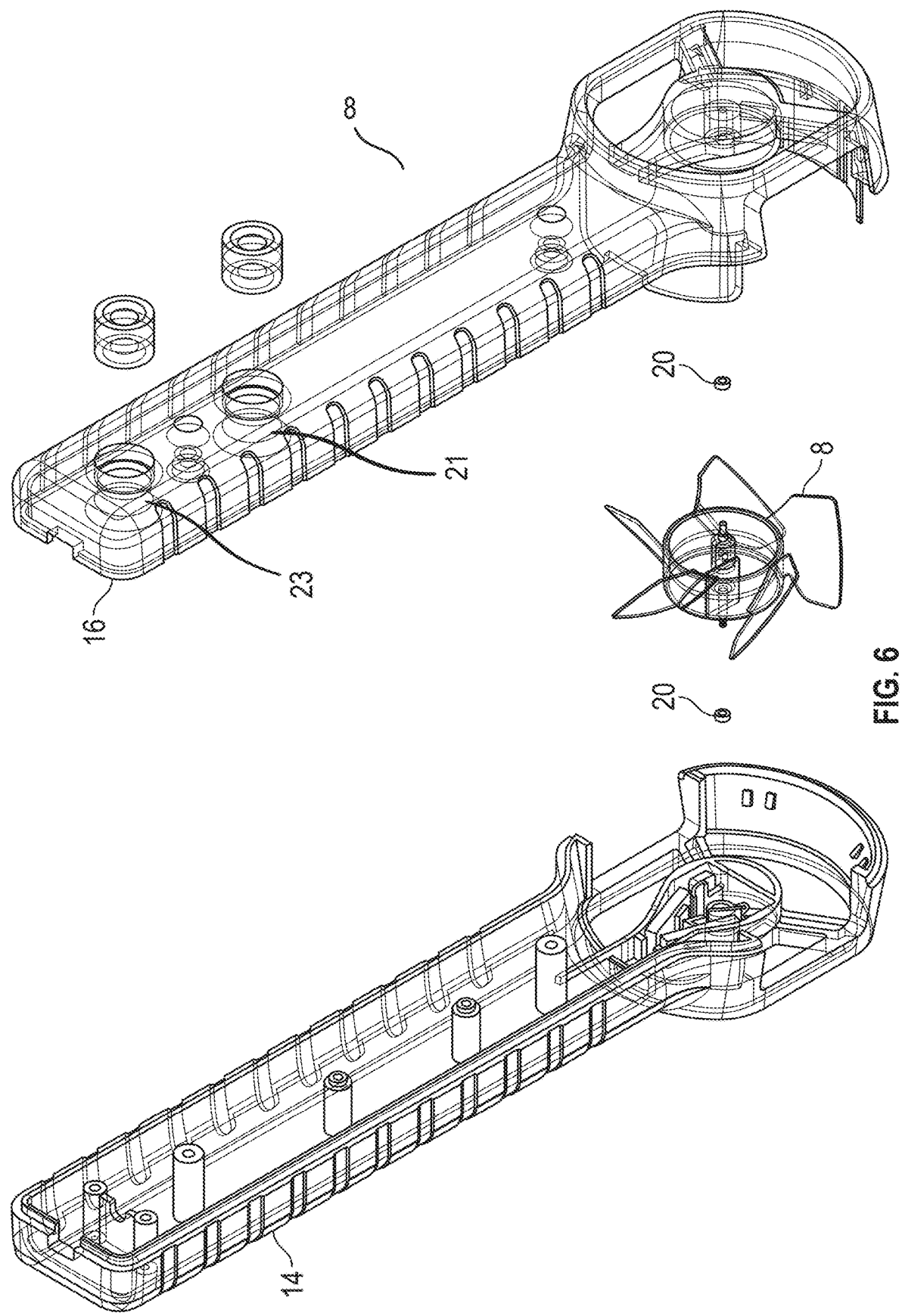
FIG. 6 an exploded view of various components of the flow sensor implementation 6 illustrated in FIG. 3 is illustrated.

Referring to FIG. 2 and FIG. 3, an implementation of a fluid flow sensor 6 is illustrated in an assembled configuration and FIG. 2 is a top view of an assembled fluid flow sensor 6. FIG. 4 and FIG. 5 illustrates different views of the fluid sensor 6 of FIGS. 2 and 3. FIG. 6, illustrates an exploded perspective view of the fluid flow sensor 6. As illustrated in FIG. 6, the fluid flow sensor 6 includes a housing with a removable first shell 14 and a removable second shell 16. The removable first shell 14 and the removable second shell 16 may be made from, by non-limiting example, plastic, resin, aluminum, steel, any other metal(s), a metal alloy, a composite material, or any other rigid material. In various implementations, the housing/removable first shell 14 and second shell 16 may be substantially a compound/complementary shape. In other implementations the removable housing formed by coupling the removable first shell 14 and the removable second shell 16 may comprise other types of shapes including, by non-limiting example, a triangular prism, cuboidal, a pentagonal prism, a hexagonal prism, a trapezoidal prism, a cone, a pyramid, or any other three-dimensional shape formed by extruding a two-dimensional closed shape into three dimensions. Also in various implementations, the cross-sectional shape of the first removable shell 14 and second removable shell 16 may vary along the length of the housing to change in size or change in shape. In particular implementations, the first shell 14 and the second shell 16 may be designed to have each of their topmost sides as oblong shaped structures when both the first shell 14 and the second shell 16 are coupled to each other. In one implementation, portions of the first shell 14 and the second shell 16 opposite to the topmost side are substantially rectangularly shaped to enable easy handling and placement by the user.

Referring again to FIG. 3, the fluid flow sensor 6 includes a blade assembly 8 that is rotatably coupled within a central vane structure 10 formed on both sides of the blade assembly 8. In particular implementation, the blade assembly 8 and the central vane structure 10 may be coupled within the oblong structure formed on the topmost position through coupling the first shell 14 and the second shell 16 together. In reference to FIG. 1, the blade assembly 8 is illustrated to be in contact with airflow indicated by arrow 4. As illustrated in FIG. 1, the rotation of the blade assembly 8 by the air flow indicated by the arrow 4 is detected by a sensor in the fluid flow sensor 6 and an electrical signal is generated in response and conveyed to the scent diffuser 1.

Referring again to FIG. 3, the central vane structure 10 is illustrated. As illustrated in FIG. 3, the central vane structure 10 is formed in both the first shell 14 and the second shell 16. The central vane structure 10, as illustrated in FIG. 3, is configured to guide the air towards the blade assembly 8. Further, as illustrated in FIG. 3, the fluid flow sensor 6 includes electrical jacks 12 configured to engage with a corresponding plug or other electrical connectors to allow a wire to carry the signal from the fluid flow sensor 6 to one or more scent diffusers 1. As also illustrated in FIG. 6, the electrical jacks 12 are coupled within one or more slots 21, 23 included in the first shell 14 of the fluid flow sensor 6. In one implementation, the fluid flow sensor 6 illustrated in FIG. 3 is a wired implementation using wires that couple into the electrical jacks 12. In other implementations, a wireless module (not shown) may be included in the fluid flow sensor 6 and paired/connected with the scent diffuser(s) 1 and a signal corresponding with the airflow transmitted over a wireless telecommunication channel. In various implementations, the wireless telecommunication channel may be, by non-limiting example, BLUETOOTH™, ZIGBEE™, WIFI™, 802.11x, radio, or any other wireless telecommunication protocol type or method. Appropriate wiring to the electrical jacks 12 from the sensing components of the flow sensor may be included in various implementations which is not shown in the drawings in this document.

Referring to FIG. 6 again, an exploded view of various components of the fluid flow sensor 6 is illustrated. As illustrated in FIG. 6, the blade assembly 8 is held in place between two or more bushings 20. The two or more bushings 20 ensure that the blade assembly 8 does not bind against either of the first shell 14 and the second shell 16 and the blade assembly 8 remains free to spin under the influence of airflow around an axle shown inserted into the blade assembly 8.

Figure 7:
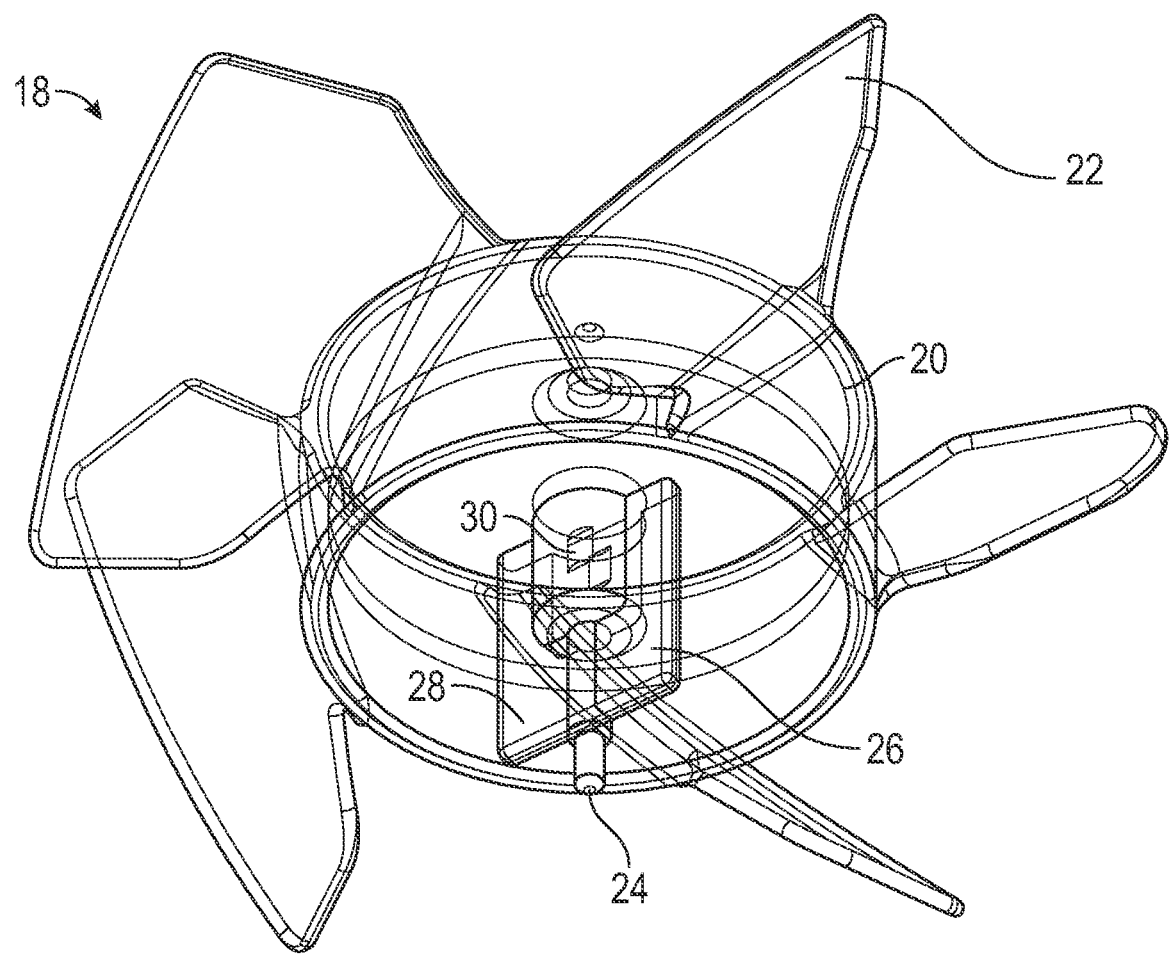
FIG. 7 is a close-up perspective view of a blade assembly implementation configured to engage within a fluid flow sensor.

Referring to FIG. 7, a close-up perspective partial see-through view of the blade assembly 8 from FIG. 6 is illustrated. As illustrated in FIG. 7, a blade portion 22 of the blade assembly 8 includes five blades. In other implementations, fewer or more blades may be used. The blade assembly 8 is also designed to be inserted over a blade axle 24 which supports the blade assembly 8 in place between the first shell 14 and the second shell 16 of the fluid flow sensor 6. In some implementations, the blade portion 22 of the blade assembly 8 may be fixedly coupled to the blade axle 24 via gluing, a friction fit, or a locking feature on the blade axle 24 itself. In other implementations, however, the blade portion 22 of the blade assembly 8 may not be fixedly coupled, and thus may be able to rotate freely about the blade axle 24 (whether the blade axle is free to rotate relative to the two halves 14, 16 or not). As illustrated in FIG. 7, the blade portion 22 also includes flags 26, 28 that extend on opposite sides of a hub 30 to which the blades are attached.

Figure 8:
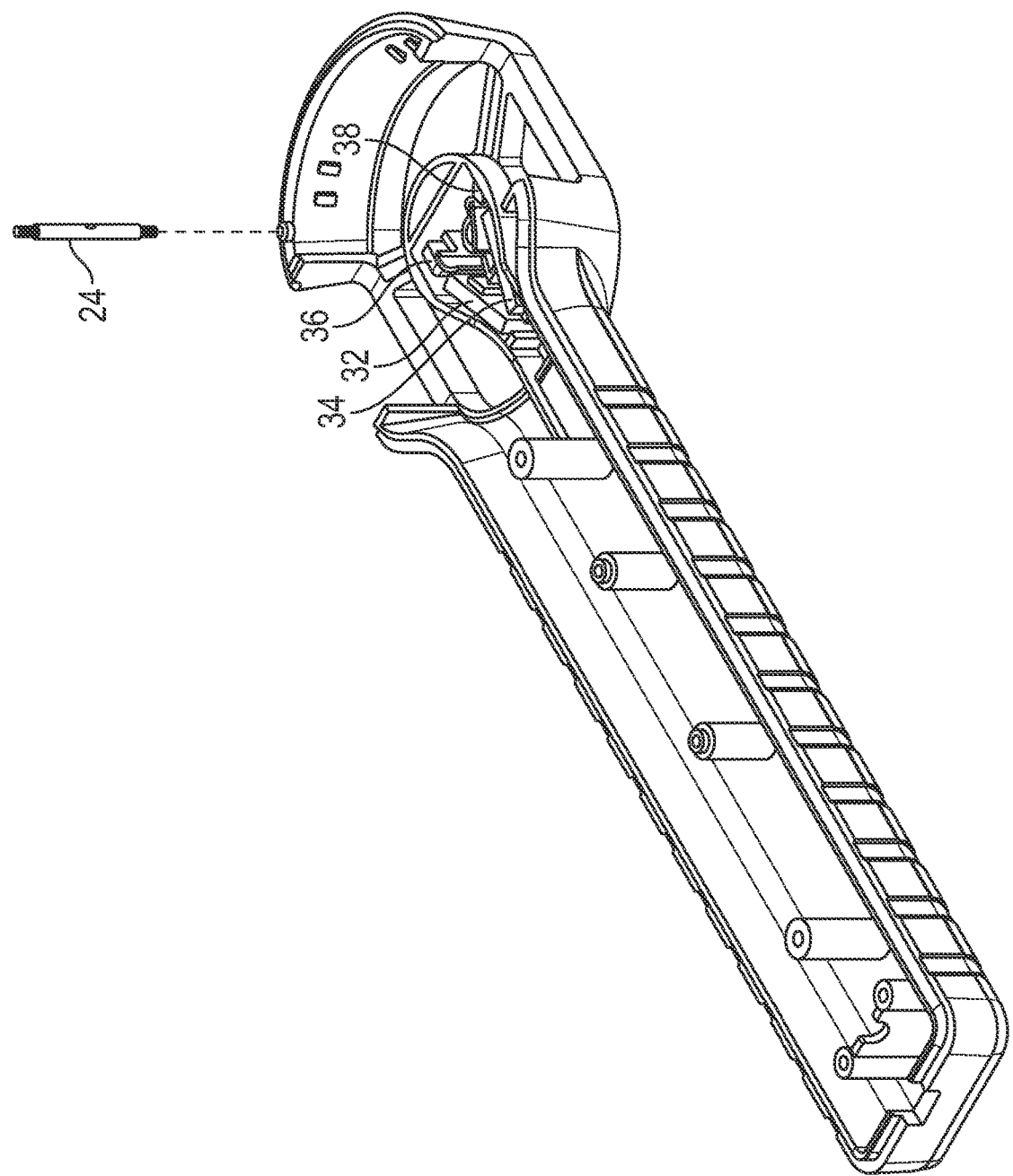
FIG. 8 is a close-up perspective view of the second shell of the fluid flow sensor implementation from FIG. 3.

In reference to FIG. 8, one or more sensing elements 32, 34, 36, 38 are illustrated. As illustrated in FIG. 8, the sensing elements 32, 34, 36, 38 are coupled within the second shell 16 for detecting the rotation of the blade assembly 8. Referring again to FIG. 7, the flags 26, 28 as illustrated in FIG. 7 are used by one or more sensing elements 32, 34, 36, 38 of the flow sensor 6 to detect the rotation of the blade assembly 8. In one implementation, and as illustrated in FIG. 7, two flags 26, 28 are used. In yet another implementation of fluid sensor 6, only one flag may be used or more than two flags may be used. The material of the flags 26, 28 may also be the same as that of the blade portion 22 in some implementations or may be a different material depending upon what type of sensor elements 32, 34, 36, 38 are used.

Referring again to FIG. 7, the blade assembly 18 is illustrated to be configured to rotate about blade axle 24 while the flags 26, 28 rotate correspondingly. As illustrated in FIG. 7, the sensor elements 32, 34, 36, 38 detect the movement of the flags 26, 28 as they spin and generate a corresponding electrical signal with a voltage/current that is then transmitted to jacks 12 via internal wiring (not shown). In various implementations, the sensor elements 32, 34, 36, 38 may be, by non-limiting example, Hall effect sensors, photo sensors, optical encoder sensors, capacitive sensors, or any other sensor type that can interact with the flag and generate a periodic signal. In various implementations, additional components may be included depending on the sensor type to allow the sensor to operate. For example, an LED or other light source may be included with a photo-sensor to provide a light source for the flags to interrupt so the photosensor can detect the resulting light pattern. A wide variety of sensor elements and systems may be constructed using the principles disclosed in this document. In one implementation, various signal processing methods and associated memory and processor(s) may be employed to analyze the signal from the sensor elements to create a corresponding signal that the scent diffuser 1 is designed to recognize as indicating air flow is occurring. In some implementations, the raw electrical signal may be fed directly to the scent diffuser 1 itself which may do the signal processing on its own. In some implementations, the presence of the signal, standing alone, may operate as a true/false signal to inform the scent diffuser 1 that air flow 4 is occurring, and the scent diffuser 1 may then take pre-programed action in response to receiving the electrical signal.

In various implementations, the blade assembly 8 may be formed as an integral piece but in others, various portions of the blade assembly 8 may be formed separately and coupled together. For example, the blades may be separately formed and coupled to the hub 30 and/or the flags 26, 28 may be separately formed and coupled to the hub 30. Those of ordinary skill will be able to use the disclosure herein to construct various blade assembly implementations.

The materials used for the blade assemblies 8, flags 26, 28, wiring, etc. may be made of conventional materials used to make goods similar to these in the art, such as, by non-limiting example, metals, plastics, semiconductor materials, and the like. Those of ordinary skill in the art will readily be able to select appropriate materials and manufacture these products from the disclosures provided herein.

Figure 9:
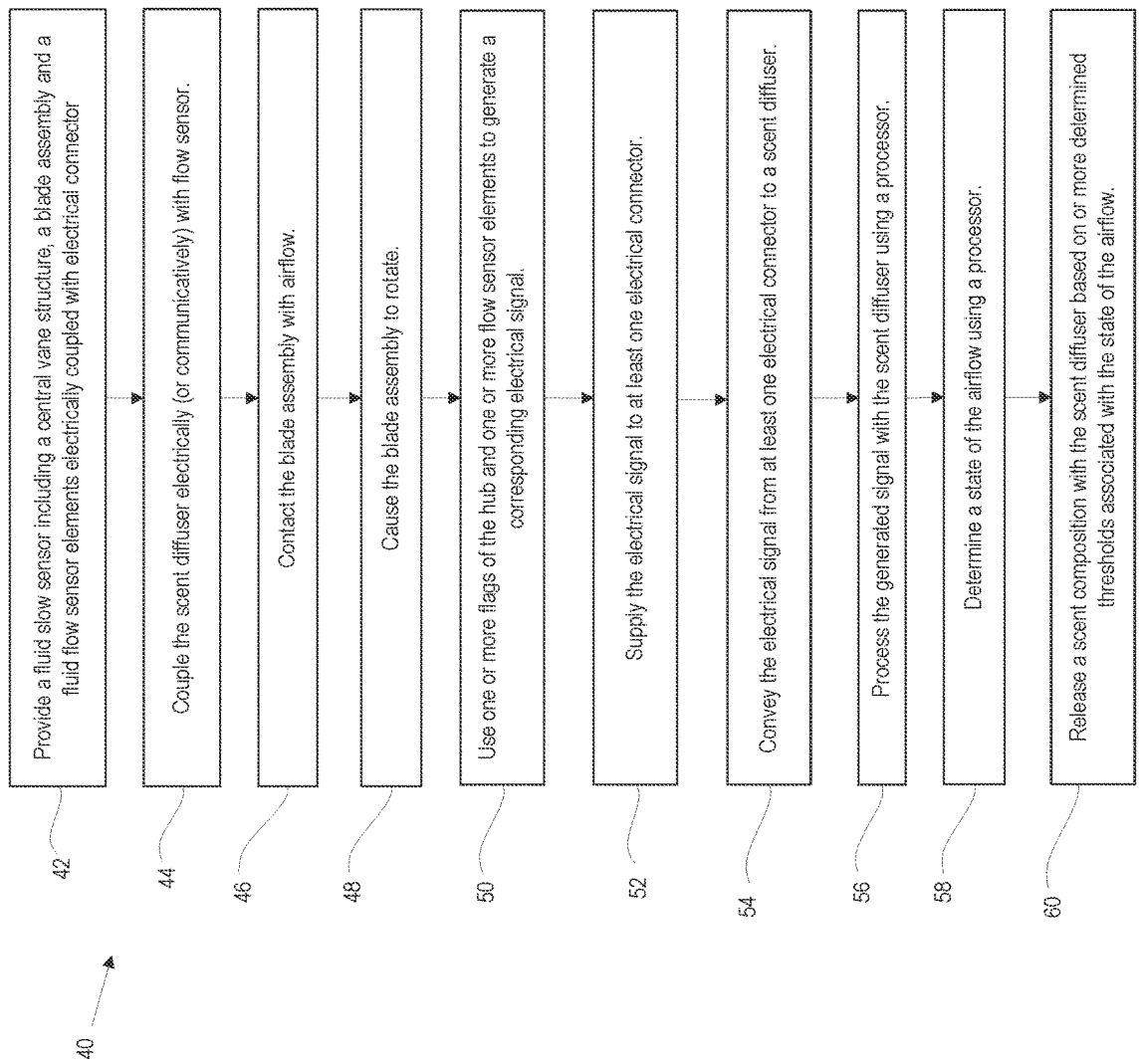
FIG. 9 is a flow chart of an implementation of a method of sensing fluid flow using a fluid flow sensor assembly.

In reference to FIG. 9, a flow chart of an implementation of a method of sensing fluid flow using a fluid flow sensor assembly 2 is illustrated. As illustrated in FIG. 9, the method of sensing fluid flow includes providing a fluid sensor 6 including a central vane structure 10, a blade assembly 8 and a one or more fluid flow sensor elements 32, 34, 36, 38 electrically coupled with electrical connector (step 42). The method may also include electrically (or communicatively via a telecommunication channel) coupling the scent diffuser 1 with fluid flow sensor assembly 2 in various implementations, coupling like those disclosed herein may be utilized (step 44).

In reference to FIG. 9, in particular method implementations, the method further includes contacting the blade assembly with airflow (step 46). The method may further include rotating the blade assembly (step 48). The method also includes using one or more flags of the hub and one or more flow sensor elements for generating a corresponding electrical signal (step 50) for the rotation. Further, the method may also include supplying an electrical signal from at least electrical connector (step 52). The method also includes conveying the electrical signal from at least one electrical connector to a scent diffuser (step 54). Further, the method includes processing the generated signal with the scent diffuser using a processor (step 56). The method also includes determining a state of the airflow using a processor (step 58). In particular implementations, the method includes releasing a scent composition with the scent diffuser based on or more determined threshold associated with the state of the airflow (step 60).

Figure 10:
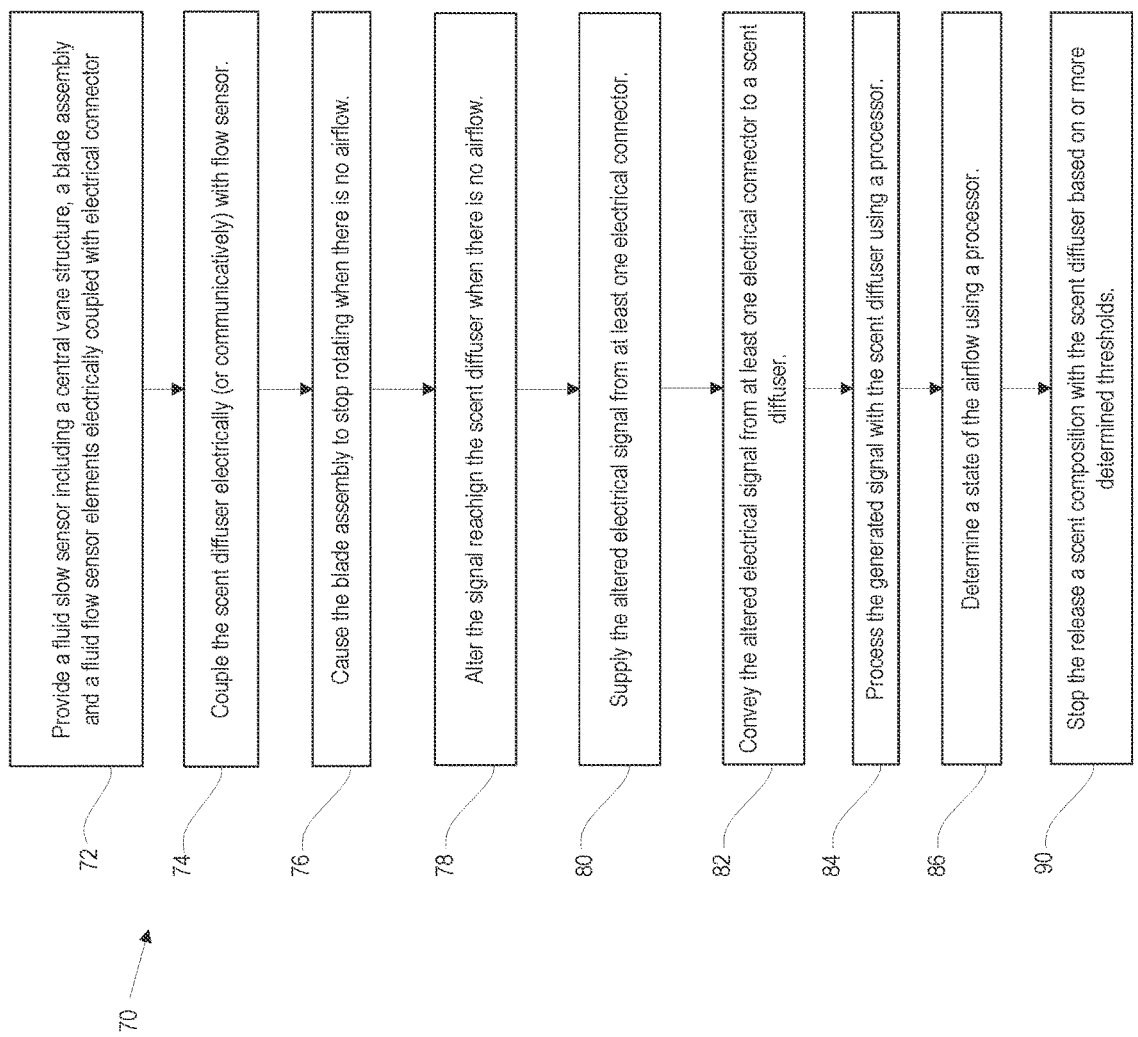
FIG. 10 is a flow chart of another implementation of a method of sensing fluid flow using a fluid flow sensor assembly.

In reference to FIG. 10, a flow chart of an implementation of another method of sensing fluid flow using a fluid flow sensor assembly is illustrated. During operation of scent diffusers, a vapor or spray of a composition that includes a perfume or other scent agent is released. Various scent diffusers release the scent composition at various time intervals. Some scent diffusers use a timer or timing system to determine when to release more scent composition. For such scent diffusers, particularly scent diffusers are placed in HVAC ducting, if there is no airflow through the particular duct in which the scent diffuser is placed, the scent composition will gradually build up in the air in the duct as time passes. Then, when airflow through the duct is resumed, a large quantity of scent composition will be transported at the same time, producing an undesirable sudden burst of perceptible odor at the point where the airflow exits the duct.

The method of fluid flow sensor implementations disclosed herein are configured to couple/connect with a scent diffuser and provide an electrical signal to the scent diffuser when a flow of air is detected. This flow of air could be flow in an HVAC duct, or it could be flow out of an HVAC register indicating that air in a particular room is being turned over by an HVAC system. In either case, the presence of the flow means that the scent diffuser can dispense the scent composition to maintain a consistent scent/odor in the area adjacent to the scent diffuser. The various methods of sensing fluid flow disclosed in this document are designed to work with a scent diffuser to detect airflow in a desired location.

As illustrated in FIG. 10, the method of sensing fluid flow includes providing a fluid sensor including a central vane structure, a blade assembly and a fluid flow sensor element electrically coupled with electrical connector (step 72). The method also includes electrically (or communicatively over a telecommunication channel) coupling the scent diffuser with fluid flow sensor assembly 6 [in various implementations, any method coupling like those disclosed herein may be utilized (step 74)].

In reference to FIG. 10, in particular method implementations, the method further includes the blade assembly stopping rotating in response to the no airflow condition (step 76). The method further includes altering the electrical (or communication) signal in response to the non-flow of air (step 78). Further, the method includes supplying the altered electrical (or telecommunication) signal from at least one electrical connector (step 80). The method also includes conveying the altered electrical signal from at least one electrical connector to a scent diffuser (step 82). Further, the method includes processing the generated signal with the scent diffuser using a processor (step 84). The method also includes determining a state of the airflow using a processor (step 86). In particular implementations, the method includes stop releasing a scent composition with the scent diffuser based on or more determined threshold associated with the state of the airflow (step 90).

The implementations listed here, and many others, will become readily apparent from this disclosure. From this, those of ordinary skill in the art will readily understand the versatility with which this disclosure may be applied. In places where the description above refers to particular implementations of fluid flow sensing assembly and related methods and implementing components, sub-components, methods and sub-methods, it should be readily apparent that a number of modifications may be made without departing from the spirit thereof and that these implementations, implementing components, subcomponents, methods and sub-methods may be applied to other systems and methods for fluid flow sensing and dispensing scent.

What is claimed is:

1. A fluid flow sensing assembly comprising:
    a first shell coupled with a second shell comprising a central vane structure;
    a blade assembly rotatably coupled within the central vane structure, the blade assembly comprising one or more flags extending from a central hub; and
    one or more fluid flow sensor elements coupled with the second shell of the flow sensor, the one or more fluid flow sensor elements configured to detect motion of the one or more flags;
    wherein the assembly is configured to be coupled with one or more scent diffusers.

2. The assembly of claim 1, wherein a first bushing is coupled on a first side and a second bushing is coupled on a second side of the blade assembly to enable rotatable coupling of the blade assembly with the first shell and the second shell.

3. The assembly of claim 2, wherein the blade assembly comprises a blade portion coupled with a blade axle.

4. The assembly of claim 3, wherein the blade portion is fixedly coupled with the blade axle.

5. The assembly of claim 3, wherein the blade portion is rotatably coupled with the blade axle.

6. The assembly of claim 1, wherein the assembly is electrically coupled through electrical connectors with the one or more fluid flow sensor elements.

7. The assembly of claim 1, further comprising a wireless module configured to wirelessly communicate with one or more scent diffusers over a wireless telecommunication channel.

8. The assembly of claim 1, wherein one or more fluid flow sensor elements are one of Hall effect sensors, photosensors, optical encoder sensors, capacitive sensors, or any combination thereof.

9. A fluid flow sensing assembly comprising:
    a central vane structure coupled with a blade assembly comprising a blade axle;
    a hub coupled to the blade axle;
    one or more flags coupled with the hub;
    one or more fluid flow sensor elements positioned in the central vane structure configured to detect movement of the one or more flags; and
    one or more electrical connectors coupled with the central vane structure configured to be coupled with one or more scent diffusers.

10. The assembly of claim 9, wherein a first bushing is inserted on a first side of the blade assembly and a second bushing is inserted on a second side of the blade assembly to enable rotatable coupling of the blade assembly with a first shell and a second shell.

11. The assembly of claim 9, wherein the electrical connectors are electrically coupled with the one or more fluid flow sensor elements.

12. The assembly of claim 9, further comprising a wireless module configured to wirelessly communicate with one or more scent diffusers over a wireless telecommunication channel.

13. The assembly of claim 9, wherein one or more fluid flow sensor elements are one of Hall effect sensors, photosensors, optical encoder sensors, capacitive sensors, or any combination thereof.

14. A method of sensing fluid flow comprising:
    providing a fluid flow sensor comprising a central vane structure coupled with a blade assembly comprising a hub and one or more flags coupled with the hub, the central vane structure comprising one or more fluid flow sensor elements electrically coupled with at least one electrical connector comprised in the central vane structure;
    contacting the blade assembly with airflow causing the blade assembly to rotate;
    generating a corresponding electrical signal using the one or more flags of the hub and the one or more flow sensor elements and supplying the electrical signal to the at least one electrical connector;

conveying the electrical signal from the at least one electrical connector to a scent diffuser;

processing the generated signal with the scent diffuser using a processor to determine a state of the airflow; and in response to determining a state of the airflow, releasing a scent composition with the scent diffuser based on one or more predetermined thresholds associated with the state of the airflow.

15. The method of claim 14, further comprising:
upon detecting no flow of air by the flow sensor:
  altering the signal reaching the scent diffuser when there is no flow of air;
  processing the generated signal by the scent diffuser using a processor; and
  stopping the release of the scent composition by the scent diffuser based on one or more predetermined threshold.

16. The method of claim 14, wherein the electrical connectors are electrically coupled with the one or more fluid flow sensor elements.

17. The method of claim 14, wherein the fluid flow sensor further comprises a wireless module configured to wirelessly communicate with one or more scent diffusers using a wireless telecommunication channel.

18. The method of claim 14, wherein one or more fluid flow sensor elements is one of a Hall effect sensor, a photosensor, an optical encoder sensor, a capacitive sensor, or any combination thereof.

19. The method of claim 14, wherein the electrical signal is conveyed to the scent diffuser for signal processing by the scent diffuser.

20. The method of claim 14, further comprising conveying the presence of the signal by the flow sensor elements to the scent diffuser to enable to scent diffuser to selecting a pre-programmed action in response.

* * * * *